United States Patent
Moselage, III

(10) Patent No.: US 9,145,197 B2
(45) Date of Patent: Sep. 29, 2015

(54) VERTICALLY INTEGRATED STRINGERS

(71) Applicant: The Boeing Company, Chicago, IL (US)

(72) Inventor: John H. Moselage, III, Renton, WA (US)

(73) Assignee: The Boeing Company, Chicago, IL (US)

(*) Notice: Subject to any disclaimer, the term of this patent is extended or adjusted under 35 U.S.C. 154(b) by 169 days.

(21) Appl. No.: 13/685,024

(22) Filed: Nov. 26, 2012

(65) Prior Publication Data

US 2014/0145031 A1    May 29, 2014

(51) Int. Cl.
```
B64C 1/26    (2006.01)
B64C 3/18    (2006.01)
B64C 1/06    (2006.01)
B64C 3/20    (2006.01)
B64C 1/00    (2006.01)
```
(52) U.S. Cl.
CPC . *B64C 1/26* (2013.01); *B64C 1/061* (2013.01); *B64C 1/065* (2013.01); *B64C 1/068* (2013.01); *B64C 3/182* (2013.01); *B64C 3/185* (2013.01); *B64C 3/20* (2013.01); *B64C 2001/0072* (2013.01); *Y02T 50/433* (2013.01); *Y10T 29/49622* (2015.01)

(58) Field of Classification Search
CPC .......... B64C 1/08; B64C 1/069; B64C 1/068; B64C 1/061; B64C 1/06; B64C 1/064; B64C 3/185; B64C 2001/0054; B64C 2001/0072; B64C 1/26; B64F 5/00; B64F 5/0009
USPC ............... 244/119, 120, 123.12, 123.2, 123.3
See application file for complete search history.

(56) References Cited

U.S. PATENT DOCUMENTS 2,500,015 A * 3/1950 Tweney et al. ............... 244/119
2,715,598 A * 8/1955 Rees et al. .................... 428/166
3,023,860 A * 3/1962 Ellzey ........................... 244/120

(Continued)

FOREIGN PATENT DOCUMENTS

DE    10 2007 01969    10/2008
EP    1 070 661    3/2003
GB    2 268 461    1/1994

OTHER PUBLICATIONS

Extended European Search Report dated Jul. 31, 2014 from European Application No. 13 19 3450.

(Continued)

*Primary Examiner* — Tien Dinh
*Assistant Examiner* — Alexander V Giczy
(74) *Attorney, Agent, or Firm* — Baldauff IP, LLC; Michael J. Baldauff, Jr.

(57) ABSTRACT

Apparatus and methods provide for the reinforcement of various components of an aircraft utilizing vertically-oriented circumferential stringers. According to embodiments described herein, barrel skin of an aircraft fuselage may be reinforced using stringers that are vertically-oriented and circumferential. According to additional embodiments, the wing stringers of a wing can be aligned with circumferential stringers. According to further embodiments, the wing may also have one or more wing spars having an elliptical aperture. The shape of the elliptical may be configured for attachment to a fuselage so that an outer surface of the aperture is disposed proximate to an inner surface of the fuselage.

13 Claims, 9 Drawing Sheets

(56) References Cited

U.S. PATENT DOCUMENTS

| | | | |
|---|---|---|---|
| 4,198,018 | A | 4/1980 | Brault |
| 5,348,602 | A | 9/1994 | Makarenko et al. |
| 6,889,937 | B2 * | 5/2005 | Simpson et al. ............ 244/123.1 |
| 2002/0153454 | A1 * | 10/2002 | Seidel ............................ 244/119 |
| 2004/0040252 | A1 * | 3/2004 | Beral et al. ..................... 52/729.3 |
| 2007/0095982 | A1 * | 5/2007 | Kismarton et al. ............ 244/119 |
| 2008/0179460 | A1 * | 7/2008 | Rodriguez et al. ............ 244/119 |
| 2008/0237442 | A1 * | 10/2008 | Sarh ................................ 249/184 |
| 2008/0283664 | A1 | 11/2008 | Calamvokis |
| 2010/0133382 | A1 | 6/2010 | Pahl |
| 2010/0187352 | A1 * | 7/2010 | Yavilevich ....................... 244/36 |
| 2010/0320320 | A1 * | 12/2010 | Kismarton .................... 244/119 |
| 2011/0180665 | A1 * | 7/2011 | Mahieu .......................... 244/120 |
| 2011/0290939 | A1 | 12/2011 | Noebel |

OTHER PUBLICATIONS

Extended European Search Report dated Jul. 28, 2014 from European Application No. 13 19 3443.

Johnson, Jr., R., "Design and fabrication of a ring-stiffened graphite-epoxy corrugated cylindrical shell" <http://ntrs.nasa.gov/archive/nasa/casi.ntrs.nasa.gov/19780023522_1978023522.pdf> NASA Contractor Report 3026, Aug. 1978.

Bushnell, D. et al., "Approximate Method for the Optimum Design of Ring and Stringer Stiffened Cylindrical Panels and Shells with Local, Inter-Ring, and General Buckling Modal Imperfections," Computers & Structures, vol. 59. No. 3, pp. 489-527, Elsevier Science Ltd., 1996.

* cited by examiner

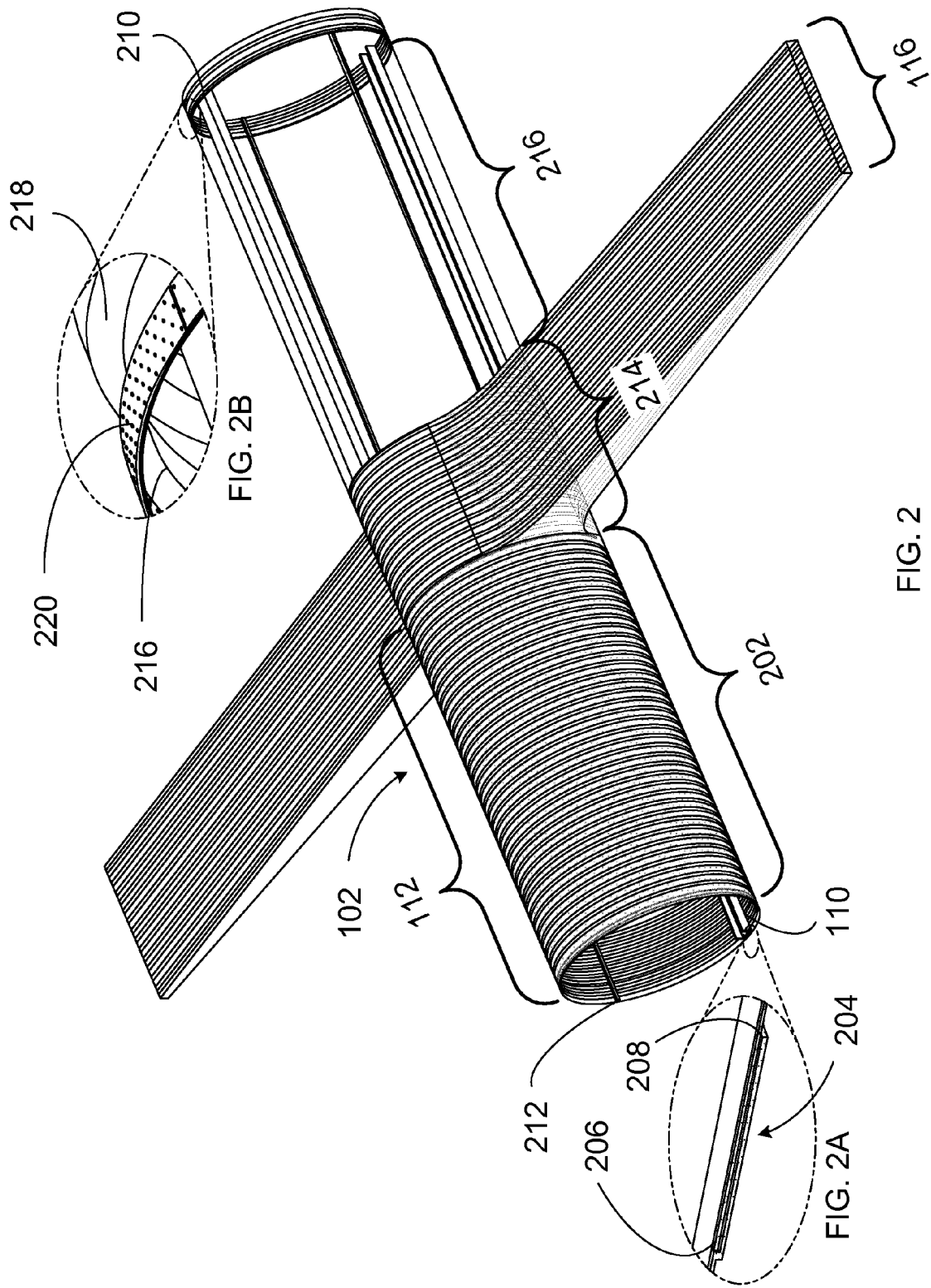

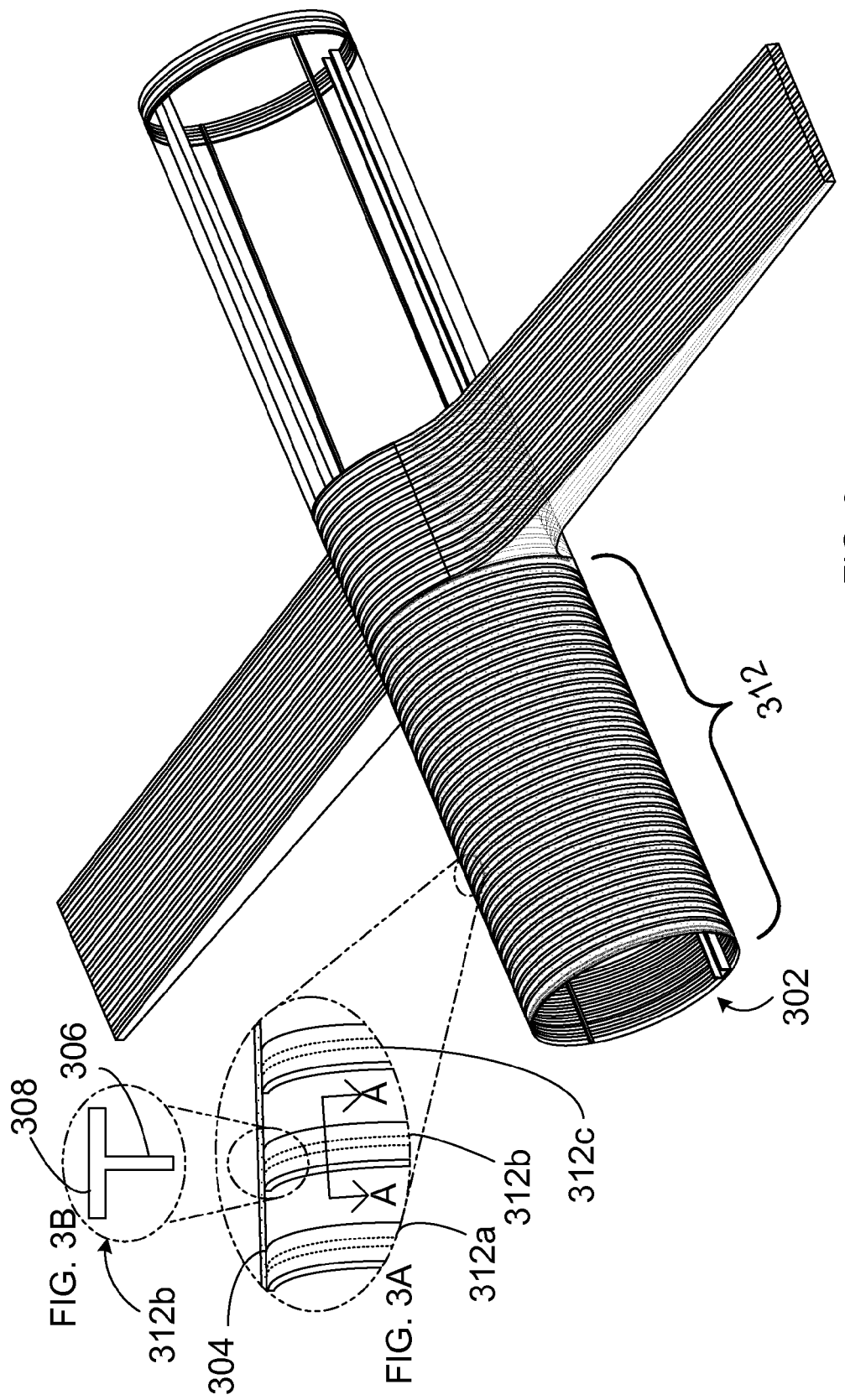

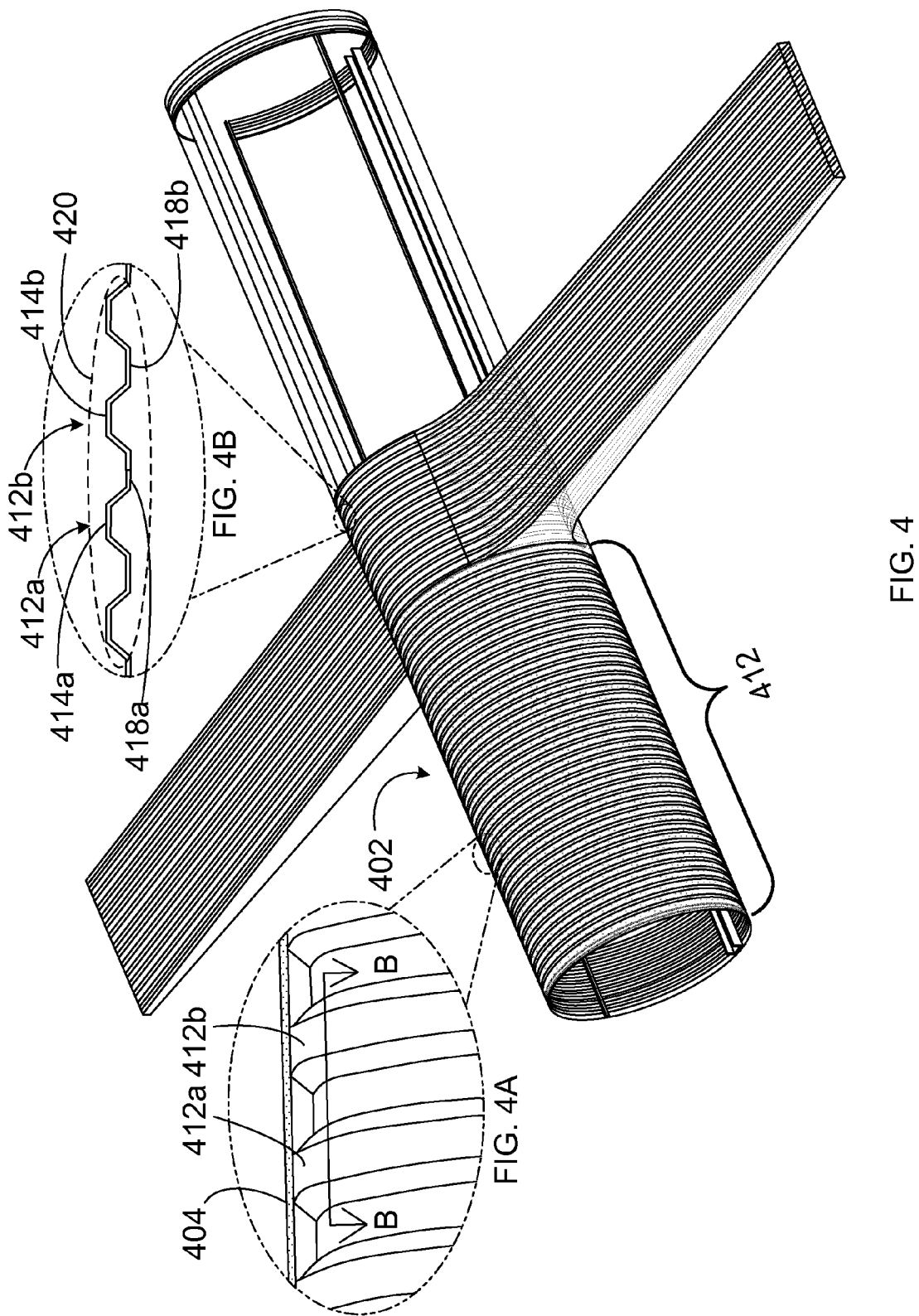

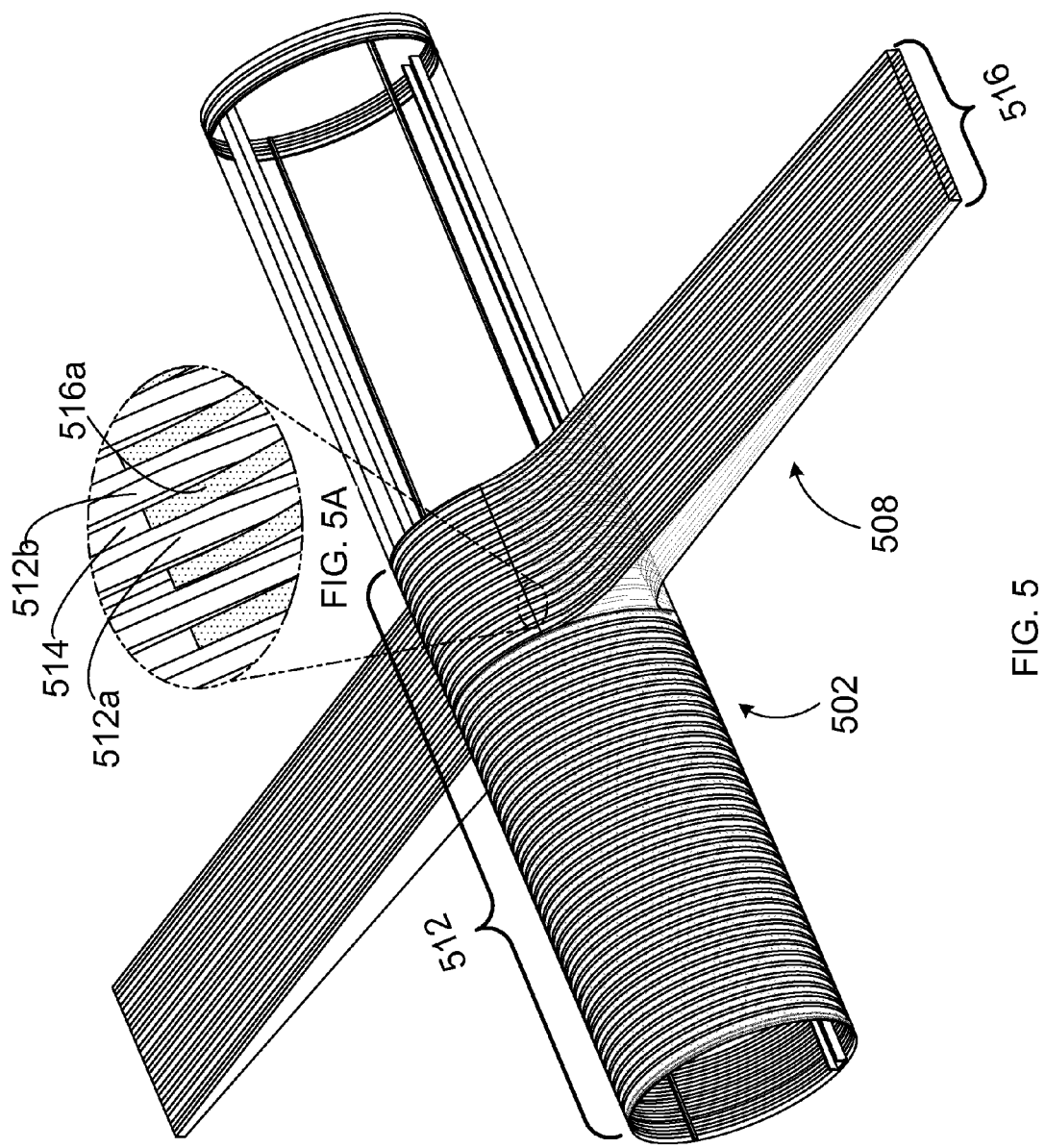

VERTICALLY INTEGRATED STRINGERS

BACKGROUND

Aircraft commonly utilize relatively thin strips of material, or "stringers," oriented longitudinally parallel to a central axis of the aircraft to provide strength and stiffening characteristics to the skin covering the fuselage. Existing aircraft fuselages are typically manufactured in cylindrical sections that are joined end-to-end to create a fuselage having the desired length. In manufacturing a fuselage section, a number of stringers are bonded to the skin such that each stringer terminates at the fore and aft ends of the fuselage section. When the fuselage sections are joined to adjacent fuselage sections, each end of a stringer must be spliced into a corresponding end of a stringer of the adjacent fuselage section. This splicing operation is a tedious, labor-intensive process.

In addition, with each splice in a conventional fuselage configuration, there exists a potential for delamination or other structural failure or fatigue due to common loads and moments induced throughout the aircraft fuselage during flight. To prevent these structural failures, splice plates and fasteners are typically used, which significantly increase the weight and cost of the aircraft.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods provide for a reinforced aircraft fuselage using vertically-oriented, circumferential stringers. According to one aspect of the disclosure provided herein, an aircraft fuselage may include a skin having an inside surface. The skin may extend along a longitudinal axis. A number of stringers may be disposed substantially normal to the longitudinal axis. The number of stringers may be vertically-oriented circumferentially along the longitudinal axis.

According to another aspect, an aircraft may have a fuselage that may include a barrel skin having an inside surface. The barrel skin may extend longitudinally along a first axis. A number of barrel stringers may be disposed substantially normal to the first axis. The barrel stringers may be vertically-oriented circumferentially along the first axis. The aircraft may also have a wing with a wing skin. The wing skin may have an inside surface with a first end adjacent to the fuselage and a second end distal to the first end. The wing may have a number of wing stringers coupled to the inside surface of the wing skin. The wing stringers may be oriented so that they substantially align with the fuselage circumferential stringers.

According to another aspect, a method for stiffening an aircraft may include forming a barrel skin having an inside surface that extends longitudinally along a first axis. A number of stringers are formed that are circumferentially oriented and substantially parallel to each other. The stringers are coupled to the barrel skin so that at least a portion of the stringers are aligned normal to the first axis.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 2 is a top perspective view illustrating the attachment of adjacent fuselage sections, skins and circumferential stringers, according to various embodiments presented herein;

FIG. 2A is a close-up, top perspective view illustrating the attachment of aircraft skin to a fuselage section, according to various embodiments presented herein;

FIG. 2B is a close-up, top perspective view illustrating the coupling of adjacent fuselage sections, according to various embodiments presented herein;

FIGS. 3, 3A and 3B are various views of exemplary circumferential blade stringers, according to various embodiments presented herein;

FIGS. 4, 4A and 4B are various views of exemplary circumferential corrugated stringers, according to various embodiments presented herein;

FIGS. 5 and 5A are various views illustrating the attachment of wing stringers to the fuselage of an aircraft, according to various embodiments presented herein;

DETAILED DESCRIPTION

Figure 1:
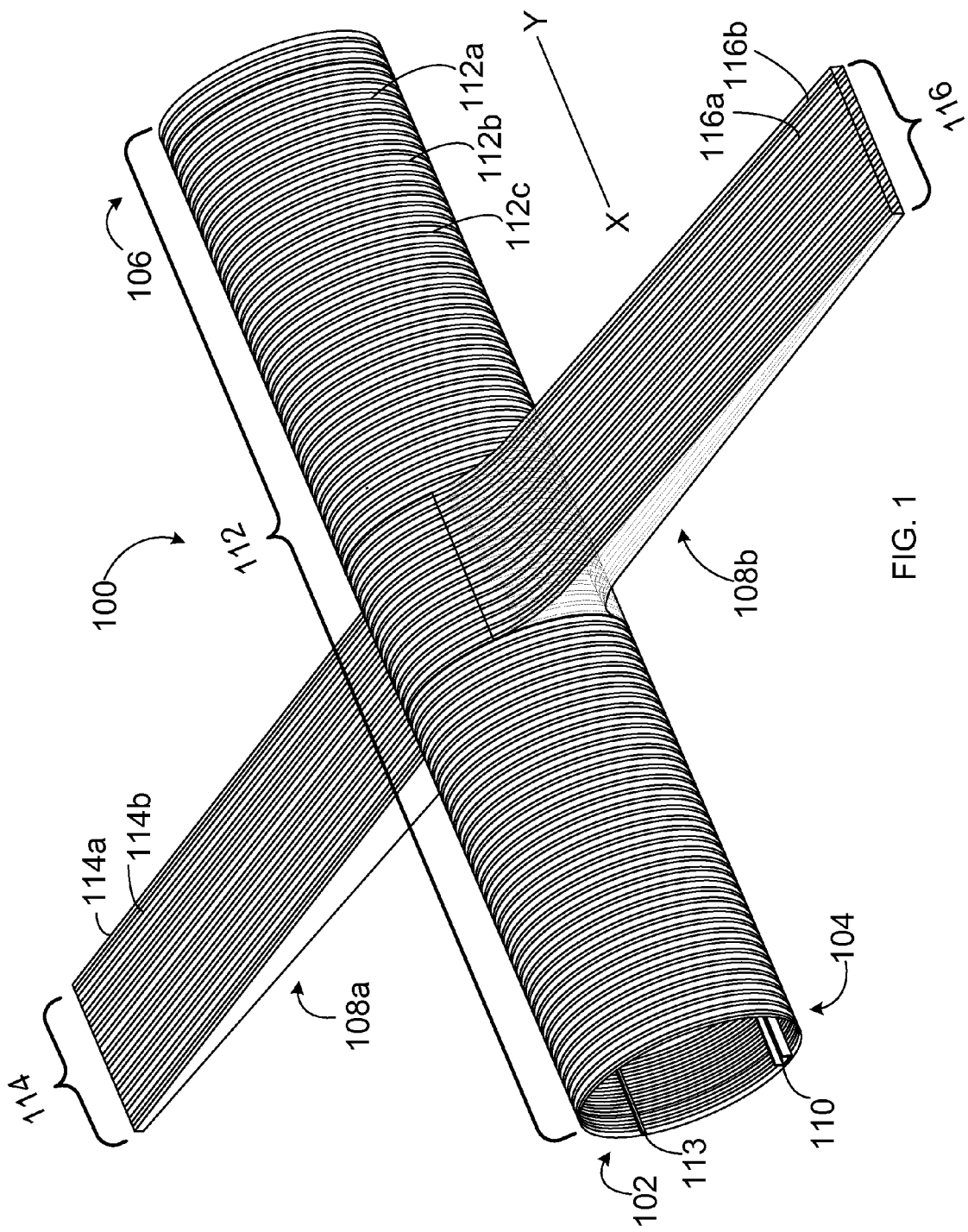
FIG. 1 is a top perspective view of an exemplary fuselage and wing sections an aircraft using circumferential stringers, according to various embodiments presented herein.

The following detailed description provides for reinforcing aircraft structures. As discussed briefly above, aircraft commonly use conventional stringers that are oriented longitudinally parallel to a central axis of the aircraft to provide strength and stiffening characteristics to the skin covering the fuselage. The fuselage of a conventional aircraft is typically formed from multiple sections that are joined together. Using conventional stringers, each end of every stringer has to be spliced into a corresponding end of an adjacent stringer of the adjacent fuselage section. This is a time-consuming, labor-intensive process. Other limitations using conventional stringers are also briefly discussed above.

Utilizing the concepts described herein, the skin of an aircraft fuselage may be structurally reinforced using stringers that are vertically-oriented circumferentially along the fuselage. Rather than using stringers that run along the fuselage fore to aft, stringers that are vertically-oriented circumferentially along the fuselage may reduce the labor and time costs associated with stringers that run along the fuselage. Further, in some embodiments, the stringers and/or the fuselage or wing skin may be formed using various manufacturing techniques, such as a forming mandrel, that may reduce manufacturing time and cost. Exemplary techniques are described in copending patent application entitled, "Multi-Box Wing Spar and Skin," filed on Nov. 26, 2012, which is hereby incorporated herein in its entirety.

Also, as will be described below, wing root loads may be reacted circumferentially around the fuselage. Aircraft wings may be coupled to the fuselage via wing spars that encircle and/or encompass a portion of the fuselage. Wing spars may be attached directly to the fuselage. The wing stringers may line up with and be attached to the vertically-oriented fuselage circumferential stringers. The fuselage stringers that are configured to couple (mate) the wing stringers can be sized to accommodate the loads coming off the wing stringers. The wing stringer loads may then travel up the fuselage stringers/frames to be canceled/reacted with the loads coming from the opposite wing at the crown and/or keel locations. It should be appreciated that the concepts described herein relating to an aircraft wing may also be used for other aircraft components, such as a vertical or horizontal stabilizer, without departing from the scope of this disclosure and the accompanying claims.

In the following detailed description, references are made to the accompanying drawings that form a part hereof, and which are shown by way of illustration, specific embodiments, or examples. Referring now to the drawings, in which like numerals represent like elements through the several figures, the use of circumferential stringers will be described.

Turning to FIG. 1, a top perspective view of a portion of an aircraft 100 is shown. Aircraft 100 may have fuselage 102 that extends along longitudinal axis "XY" from the forward portion 102 of the fuselage to the aft portion 106 of the fuselage. Aircraft 100 may also have wings 108a and 108b. It should be understood that wings 108a and 108b are shown in a straight-wing formation for illustration purposes only. Although the various embodiments may be discussed and/or illustrated with respect to wings 108a and 108b in a straight-wing configuration, the concepts and embodiments described herein may be equally applicable to other wing configurations, including, but not limited to, a swept-wing configuration (as illustrated by way of example in FIG. 6), without departing from the scope of this disclosure and the accompanying claims.

According to one illustrative embodiment, fuselage 102 may be reinforced along axis XY through the use of various beams, including, but not limited to, keel beam 110 and/or crown beam 210 (shown in FIG. 2). Fuselage 102 may also have additional structural elements such as supporting member 113 to provide further structural support and/or to provide for the attachment of various aircraft components such as a floor. In conventional aircraft, a number of longitudinal stringers extending along axis XY may be used to structurally reinforce a fuselage and a skin (not shown). However, embodiments described herein utilize stringers that vertically-oriented circumferentially along the fuselage, which reduces or eliminates the number of conventional longitudinal stringers used.

Fuselage 102 has circumferential stringers 112 that are vertically-oriented along fuselage 102. Exemplary circumferential stringers 112a-c of circumferential stringers 112 are shown by way of example to illustrate the orientation of the stringers along fuselage 102. It should be noted that circumferential stringers 112a-c are called out and specifically identified in FIG. 1 for descriptive purposes only. It should be appreciated that a fuselage, such as fuselage 102 illustrated in FIG. 1, may have more or less stringers than those which are illustrated in FIG. 1. Further, it should be appreciated that the distance between circumferential stringers 112 are illustrative only and do not reflect an intent to limit the scope of the present disclosure or accompanying claims to equally-spaced stringers, as stringer spatial configurations may vary from aircraft-to-aircraft or along a fuselage.

As previously stated, circumferential stringers 112 are vertically-oriented circumferentially along fuselage 102. As illustrated, stringers 112a-c are circumferentially aligned (i.e. at least partially encircle an inner, longitudinal axis of fuselage 102) and vertically-oriented (i.e. when viewed from the side of fuselage 102, whereby axis XY is horizontal from a viewer's left side to a viewer's right side, circumferential stringers 112 run vertically, or normal to, axis XY). It should be appreciated that circumferential stringers 112 are illustrated as being completely vertically-oriented for illustrative purposes only and do not reflect an intent to limit the scope of the present disclosure or accompanying claims to stringers that are perfectly vertical, as some of circumferential stringers 112 may also be partially or substantially vertical depending on the particular design criteria of the aircraft. In other words, some of circumferential stringers 112 may have an angular displacement greater than or less than normal to axis XY. For example, and not by way of limitation, a portion of circumferential stringers 112 may be tilted towards one end of fuselage 102. In this configuration, the portion of circumferential stringers 112 that are tilted towards one end of fuselage 102 may be angled so that other components of an aircraft may be integrated with the portion of circumferential stringers 112 that are tilted towards one end of fuselage 102. For example, if wings 108a and 108b are in a swept-wing configuration, the portion of circumferential stringers 112 that are tilted towards one end of fuselage 102 may be angled so that wing stringers 114 may be integrated more readily into fuselage 102. In some embodiments, circumferential stringers 112 are constructed using metal-forming processes or, if made of a polymeric, composite, or plastic material, may be molded. Examples of various composite, plastic or other materials may include carbon fiber reinforced composites or carbon fiber reinforced thermoplastic composites.

Wings 108a and 108b may be integrated with fuselage 102 vis-à-vis the use of wing spars (examples of which are described herein below) and wing stringers 114 and 116, respectively. Specific examples of wing stringer 114 are identified as wing stringers 114a and 114b and wing stringer 116 are identified as wing stringers 116a and 116b. Wing stringers 114 and 116 may be used to not only reinforce various aspects of wings 108a and 108b, but also may be used to secure wings 108a and 108b to fuselage 102 and/or transfer flight loads from wings 108a and 108b to fuselage 102. It should be appreciated that a wing, such as wings 108a or 108b, may have more or less stringers than those which are illustrated in FIG. 1. Further, it should be appreciated that the distance between wing stringers 114 or 116, or their angular position relative to each other, are illustrative only and do not reflect an intent to limit the scope of the present disclosure or accompanying claims to equally-spaced, parallel stringers, as stringer spatial configurations may vary from aircraft-to-aircraft or along a wing.

FIG. 2 illustrates how the skin 204 of an aircraft may be coupled to fuselage 102. As shown in FIG. 2, fuselage 102 has exemplary circumferential stringers 112. It should be noted that fuselage 102 may be constructed using more than or fewer than circumferential stringers 112, as various fuselages may use fewer or more stringers depending on the particular fuselage section. Circumferential stringers 112 are illustrated as being vertically-oriented circumferentially disposed around a central axis, thus creating a column or barrel. It should be noted that the present disclosure is not limited to any particular manner of coupling. For example, the skin 204 may be laid up with the fuselage 102 layup or the skin 204 may be coupled to the fuselage 102 after the fuselage 102 has been laid up.

Fuselage section 202 has disposed thereon skin 204 having a first end 206 and a second end 208. Skin 204 can be coupled to fuselage section 202 using various means. For example, and not by way of limitation, first end 206 can be thermally welded to second end 208 if skin 204 is formed from a thermally-weldable material. In another example, first end 206 can be welded, riveted, or otherwise affixed to keel beam 110. In some embodiments, skin 204 may be coupled, using various coupling methods, to an externally facing, outside surface of one or more of circumferential stringers 112. In some uses, forces imposed on skin 204 during flight may be transferred into circumferential stringers 112. It should be appreciated that various methods may be used to couple first end 206 to second end 208, as well as various methods to couple skin 204 to fuselage section 202. The manner in which the components may be affixed may depend on various factors such as, but not limited to, the type of material used for circumferential stringers 112, the structural load requirements of the aircraft, etc. It should be further appreciated that skin 204 may be coupled to other aircraft components, such as crown beam 210 or side beam 212. Further, it should be appreciated that skin 204 may be affixed to more than one structural component of fuselage section 202.

As in most conventional aircraft designs, the fuselage 102 may have multiple sections coupled to each other. By way of example, fuselage 102 of FIG. 2 is shown having three exemplary sections: fuselage section 202; wing section 214; and aft section 216. Further description of how wing stringers 116 may be coupled to fuselage 102 at wing section 214 can be found in more detail below, and by way of example, in FIGS. 6A and 6B. It should be appreciated that the present disclosure is not limited to any particular fuselage configuration, as the number and type of fuselage sections may vary depending on aircraft design or other design factors.

Using various embodiments of the present disclosure, labor and/or time costs may be reduced when affixing one section of fuselage 102 to another section. In aircraft construction using conventional, longitudinal stringers, connecting one fuselage section to another fuselage section may require the alignment of up to several hundred parts, including longitudinal stringers in one section with their counterparts in an adjacent, to-be-joined section. A significant amount of time is spent aligning the two sections and drilling precise holes to join the stringers with their counterparts. After the sections are aligned and the holes are drilled, the sections typically are disassembled to deburr the various parts. Then, the stringers are affixed to each other using conventional affixing means such as, but not limited to, rivets, bolts or fasteners. In some construction processes, it can take 10 manufacturing-days to affix one section to another. Further, because rivets, spacers and other parts are typically used to join stringers together across two or more barrel sections, the aircraft weight may be adversely affected.

According to one embodiment, when using circumferential stringers 112, fuselage sections may be joined using, by way of example and not by way of limitation, an inside mold line (IML) splice strap, as illustrated in FIG. 2B. Fuselage section 216 may be abutted to adjacent fuselage section 218, shown in more detail in FIG. 2B. Because circumferential stringers 112 are disposed around a central axis of fuselage 102, circumferential stringers 112 do not need to be aligned longitudinally along the central axis, only a few, discrete number of beams may have to be aligned. Once the aircraft manufacturer rotationally aligns fuselage section 216 and fuselage section 218, the manufacturer can couple the two sections to each other using IML splice strap 220. Splice strap 220 can be used to couple fuselage section 216 to fuselage section 218 using various methods including, but not limited to, fasteners, bonding and thermal welds. It should be appreciated that the use of IML splice strap 220 is merely for descriptive purposes and does not represent an intent to limit the scope of the present disclosure or accompanying claims, as other types of straps may be used. Further, it should be noted that a splice strap, such as IML splice strap 220, may be constructed of various materials and may be joined to one or more parts of the aircraft using various affixing methods such as fasteners, chemical bonding or thermal bonding.

Various types of stringers may be used in conjunction with various embodiments of the present disclosure. Two primary embodiments of circumferential stringer configurations will be described herein, although other circumferential stringer configurations are contemplated. The first exemplary circumferential stringer embodiment is illustrated in FIGS. 3, 3A and 3B. In FIG. 3, fuselage 300 is shown constructed using circumferential blade stringers 312, illustrated in more detail in FIG. 3A.

FIG. 3A shows a small portion of fuselage 302 with fuselage skin 304 cut away for clarity purposes. Fuselage 302 is shown constructed using multiple circumferential blade stringers, illustrated by way of example as circumferential blade stringers 312a-c. Circumferential blade stringers 312 are circumferential stringers and may be constructed using various materials including, but not limited to various metals, polymers, and composites. According to various embodiments, circumferential blade stringers 312 may be manufactured from composite materials, such as composite materials having a high axial modulus fibers for increased stiffness. Composite materials commonly provide high strength characteristics with a significant weight savings as compared to conventional metallic materials. Further, it should be appreciated that circumferential blade stringers 312 may be formed according to various processes, including but not limited to, roll forming, die-casting, or a forming mandrel. Circumferential blade stringers 312 may be affixed to skin 304 of fuselage 302 using various methods, including, but not limited to, thermal bonding, thermoset, chemical bonding, or fastening.

FIG. 3B is a cross-sectional view of circumferential blade stringer 312b taken along line A-A in FIG. 3A. Circumferential blade stringer 312a is shown having web section 306 and top end cap 308. Top end cap 308 may be disposed adjacent to skin 304 of the aircraft. Circumferential blade stringer 312a may be made of any appropriate material depending on the particular application. In some embodiments, circumferential blade stringer 312 web section 306 and top end cap 308 resemble, or are in a shape substantially identical or similar to, an upper case letter "T".

FIGS. 4, 4A and 4b illustrate a second circumferential stringer embodiment. In FIG. 4, fuselage 402 is constructed using circumferential corrugated stringers 412 rather than other types of stringers, such as circumferential blade stringers 312 of FIG. 3. FIG. 4A is a close-up view of the circumferential corrugated stringers 412 of fuselage 402 with fuselage 402 skin 404 cutaway for purposes of clarity. In FIG. 4A, exemplary circumferential corrugated stringers 412a and 412b of circumferential corrugated stringers 412 may be continuous stringers of one or more sections of stringers. According to various embodiments, circumferential corrugated stringers 412 may be manufactured from composite materials, such as composite materials having a high axial modulus for increased stiffness. Further, it should be appreciated that circumferential corrugated stringers 412 may be formed according to various processes, including but not limited to, roll forming, die-casting, or a forming mandrel. Circumferential corrugated stringers 412 may be affixed to skin 404 of fuselage 402 using various methods, including, but not limited to, chemical bonding thermal bonding or fastening.

FIG. 4B is a cross-sectional view of an embodiment of circumferential corrugated stringers 412a and 412b taken along line B-B in FIG. 4A. In this embodiment, rather than being configured as individual and separate stringers, such as circumferential blade stringers 312 of FIG. 3, circumferential corrugated stringers 412 may be configured as having a series of sequential and contiguous ridges and valleys. As illustrated in FIG. 4B, circumferential corrugated stringers 412a and 412b are shown having top sections 414a, 414b, respectively, and bottom sections 418a and 418b, respectively. Top section 414a is illustrated as being contiguous with bottom section 418a, which in turn is illustrated as being contiguous with top section 414b. Top section 414b is, in turn, illustrated as being contiguous with bottom section 418b. This pattern may continue throughout the configuration of circumferential corrugated stringers 412, as partially illustrated in portion 420.

Various concepts and technologies disclosed herein may provide for the ability to install a skin, such as skin 404 of FIG. 4, last. In some embodiments, this may allow for the skin material to be an Al or Ti skin over a composite sub structure. This may be advantageous for hail strike or lightning strike purposes. It may also allow the skin to be replaced in case of damage, wherein an integral composite skin must be patched. Additionally, having a corrugated substructure, such as the embodiment described in FIG. 4, may provide a space (such as the area between top sections 414a-b and bottom sections 418a-b) where thru bolts with protruding heads can be housed for mounting interior elements like overhead storage bins etc. Putting the skin on last may also allow this kind of work to proceed at a faster pace than conventional techniques because of the increased access to both sides of the fastener.

Various manufacturing techniques may be used to form circumferential corrugated stringers 412. For example, circumferential corrugated stringers 412 may be formed using a thermoplastic or thermoset material in a mold or press. An example of a material that may be used is carbon fiber reinforced polymer (CFRP), but it should be appreciated that other materials, including metals as well as both polymeric and non-polymeric materials, may be used in accordance with various embodiments.

As discussed in reference to FIG. 1, wing stringers may be attached to a fuselage using attachment methods. FIGS. 5 and 5A illustrate an exemplary embodiment for attaching wing stringers 516 of wing 508 to fuselage 502 if wing 508 is in a straight- or nearly straight-wing configuration. Because circumferential stringers 512 may be oriented vertically along fuselage 502, wing stringers 516 can be angularly matched to fuselage 502 because of their common direction.

FIG. 5A is a close-up view illustrating how wing stringers 516 may align with circumferential stringers 512. Exemplary wing stringer 516a of wing stringers 516 is shown coupled to fuselage 502 between circumferential stringers 512a and 512b. If using circumferential corrugated stringers, such as circumferential corrugated stringers 412 of FIG. 4, wing stringer 516a may be disposed within bottom section 514 between circumferential stringers 512a and 512b. In this embodiment, the integration of wing stringers 516 into the fuselage may have no, minimal or nominal impact on the surface profile of fuselage 502. Further, in a similar manner, circumferential stringers 512 may have spaces between the stringers, as shown by way of example, circumferential blade stringers 312 of FIG. 3A. Wing stringers 516 can be placed in the spaces between circumferential blade stringers 312 to reduce the impact on the surface profile of the airplane.

Although attaching wing stringers to the fuselage of an aircraft provides for some structural reinforcement, conventional wings are typically attached to a fuselage wing box. In some embodiments according the present disclosure, one or more wing spars may be used to affix a wing to the fuselage without the need for a conventional wing box. According to various embodiments disclosed herein, wing stringers may be attached directly to an aircraft frame. In some embodiments, this attachment may help transfer aero-loads from lift via shear to the frames while the wing bending loads are reacted at the wing root, providing a larger separation between the upper and lower wing roots to more efficiently react the bending moment, as described in more detail in FIG. 7. In some embodiments, affixing one or more wings to the fuselage according to various embodiments disclosed herein may provide additional benefits. For example, the top of wing 508 may be attached near the top of fuselage 502, while the bottom of wing 508 may be attached near the bottom of fuselage 502. This may provide for a larger space within the aircraft that may be used for cargo, fuel, gear, etc. For example, in some embodiments, eliminating the wing box may free up cargo space, allowing for a rear cargo door and continuous space within, without the need for two side cargo doors and two spaces. Other benefits may be achieved through the elimination of a wing box, of which the present disclosure is not limited or dependent on achieving any specific benefit or advantage.

Figure 6A:
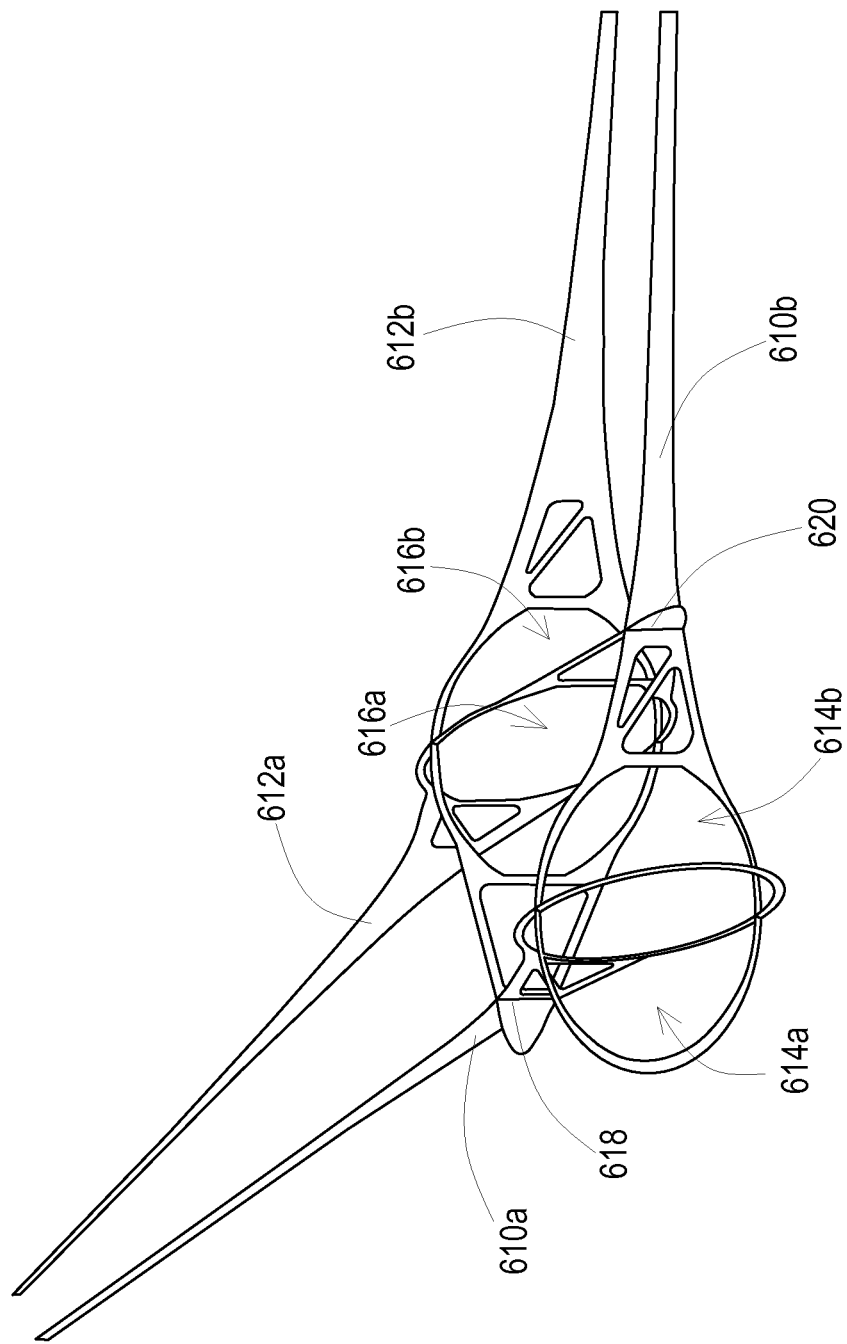
FIGS. 6A and 6B are top perspective views illustrating wing spar and circumferential stringer configurations, according to various embodiments presented herein.

FIG. 6A illustrates an exemplary wing spar configuration that may be used to attach one or more wings to a fuselage. For purposes of only illustrating an embodiment, the wing spar attachment mechanism is described herein relating to a wing, though it should be appreciated that the same attachment mechanism may be used for other aircraft components, such as, but not limited to, a horizontal or vertical stabilizer. Shown are forward spars 610a and 610b and aft spars 612a and 612b. It should be appreciated that a wing, such as wing 508 of FIG. 5, may have disposed therein fewer or more spars than two spars, without departing from the scope of this disclosure and the accompanying claims. For example, in some embodiments, there may be a single spar disposed in various locations anywhere along the chord of the wing (e.g. forward, middle, aft). In other embodiments, there may be more than two spars. The present disclosure is not limited to, nor dependent on, any specific number of spars.

Forward spars 610a and 610b have elliptical apertures 614a and 614b, respectively. Aft spars 612a and 612b have elliptical apertures 616a and 616b, respectively. Depending on the angular displacement between the aircraft wing and fuselage, apertures 614a-b and 616a-b may vary in circumference and shape, i.e. the foci may change as well as the radii. For example, in a straight-wing aircraft in which the spar may be affixed to the fuselage at approximately a 90 degree angle, apertures 614a-b and/or 616a-b may be circular. In another example, such as the one illustrated in FIG. 6, forward spars 610a-b or aft spars 612a-b are attached in a swept-wing configuration. Thus, apertures 614a-b and/or apertures 616a-b may be more oval in shape in order to provide for interior space in the aircraft and to be attached the fuselage circumferentially.

To provide for additional structural rigidity as well as wing root moment reactions, by way of example and not by way of limitation, forward spars 610a-b may be further attached to aft spars 612a-b. In the exemplary embodiment shown in FIG. 6A, aft spar 612b is attached to forward spar 610a at junction 618, and in a similar manner, aft spar 612a is attached to forward spar 610b at junction 620.

Figure 6B:
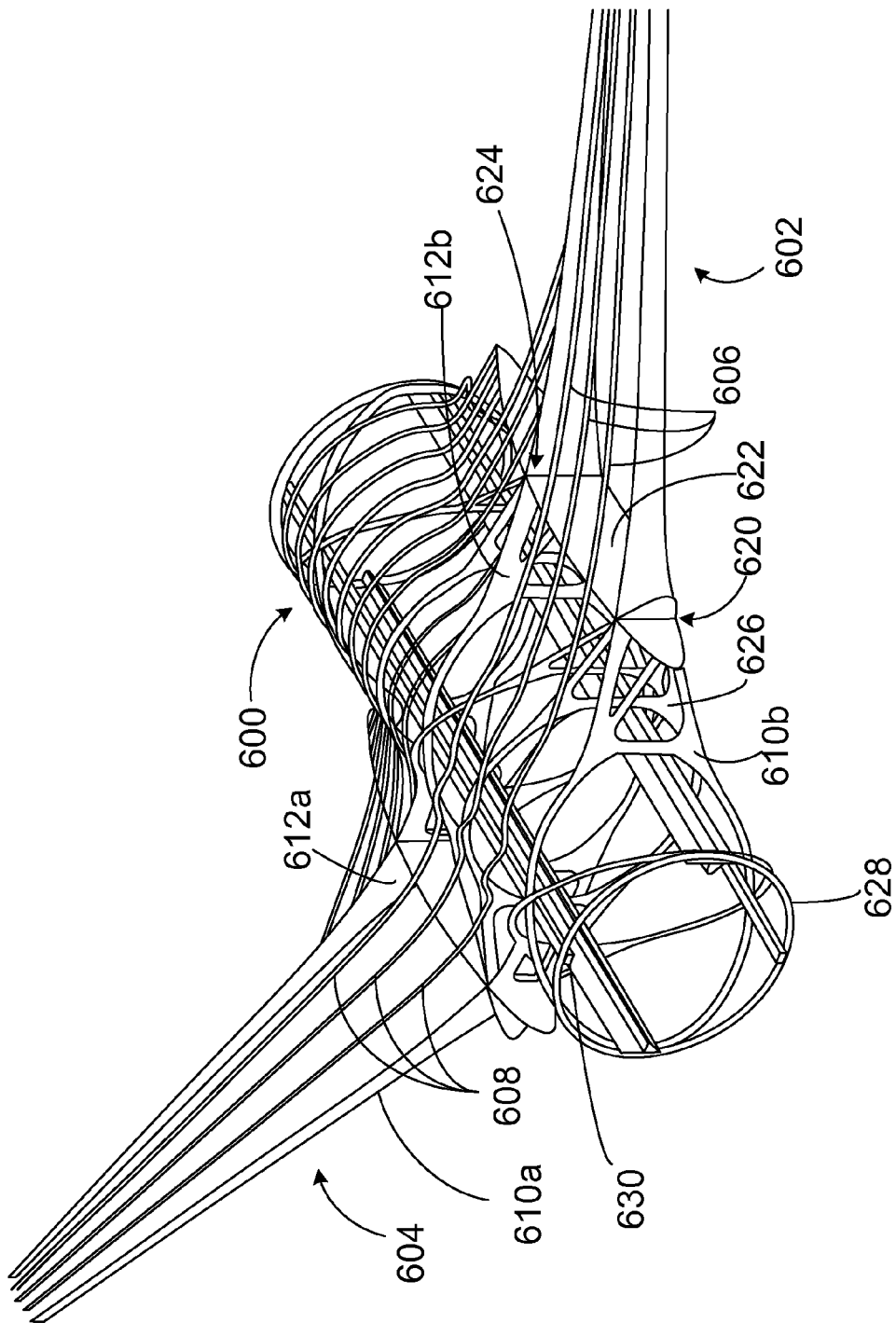

FIG. 6B illustrates the attachment of wing spars and wing stringers according to various embodiments to a fuselage. Fuselage section 600 has attached thereto wings 602 and 604. As discussed previously in some embodiments, wing 602 wing stringers 606 and wing 604 wing stringers 608 may be coupled to fuselage section 600 vis-à-vis the use of crown beam 630. One or more fuselage stringers, such as circumferential stringer 628, may be used to provide structural support to fuselage section 600. In order to provide for structural support and to attach wings 602 and/or 604 to fuselage section 600, as discussed by way of example in FIG. 6A, wing spars may be used.

Forward spars 610a and 610b have elliptical apertures 614a and 614b and aft spars 612a and 612b have elliptical apertures 616a and 616b, respectively (shown in FIG. 6A) that are shaped and placed in a manner the encompasses fuselage section 600, i.e. provides for a circumferential displacement proximate to the outer surface of the fuselage. Thus, while providing for attachment of wings 602 and 604 to fuselage section 600, forward spars 610a-b and aft spars 612a-b may also provide structural rigidity to fuselage section 600. As discussed in FIG. 6A, depending on the angular displacement between the aircraft wing and fuselage, apertures 614a-b and 616a-b may vary in circumference and shape, i.e. the foci may change as well as the radii. For example, in a straight-wing aircraft in which the spar may be affixed to the fuselage at approximately a 90 degree angle, apertures 614a-b and/or 616a-b may be circular. In another example, such as the one illustrated in FIG. 6, forward spars 610a-b or aft spars 612a-b are attached in a swept-wing configuration. Thus, apertures 614a-b and/or apertures 616a-b may be more oval in shape in order to provide for interior space in the aircraft and to be attached the fuselage circumferentially.

To help form the shape of wing 602 and, among other things, provide for additional structural support, wing 602 may have disposed therein rib 622. Although the present disclosure does not require any particular advantage or feature, rib 622 and forward spar 610b and/or aft spar 612b, having one or more spars mechanically attached to one or more ribs of a wing may help stabilize lead/lag bending between the forward spar 610a-b and aft spars 612a-b. Various embodiments of the present disclosure may also help stabilize an upper and lower skin surface (not shown) and may help join the configuration into a unitary assembly so the assembly may act as a single unit for various benefits. For example, the various embodiments of the present disclosure may help reduce or eliminate areas or locations in which forces placed on a wing may cause the wing to buckle in a first mode of bending, thus, in some cases, reducing the probability of wing buckling. It should be noted that the present disclosure is not limited to, nor dependent on, any specific number of ribs. The number of ribs in a wing may vary depending on the specific load requirements and construction of the specific wing. One such example is illustrated in FIG. 6B. In FIG. 6B, forward spar 610b is affixed to rib 622 at first junction 620 and aft spar 612b is affixed to rib 622 at second junction 624.

Further, it may be beneficial to have the wing spar of one wing to be affixed to the rib of an opposing wing. One such example is shown in FIG. 6. In FIG. 6, aft spar 612a of wing 604 is shown affixed to rib 622 at junction 620. This may increase the structural stability of the aircraft, among other benefits. Although the present disclosure is not limited to any particular benefit nor does it rely on any particular theory of operation, by affixing forward spar 610b and aft spar 612a to rib 622, increased structure rigidity may be realized without additional support structures such as a wing box. Through the use of circumferentially attached spars, such as forward spar 610b and aft spar 612b, and, in some embodiments, their counterparts in an opposing wing, the use of a wing box may be obviated.

If desired or required, additional structural support may be realized by the use of additional support structures (a third, fourth, etc. wing spar), such as crossmember 626, also attached to rib 622 at junction 620. It should be noted that one or more junctions, other than junctions 620 or 622, may be used without departing from the scope of this disclosure and the accompanying claims.

Figure 7:
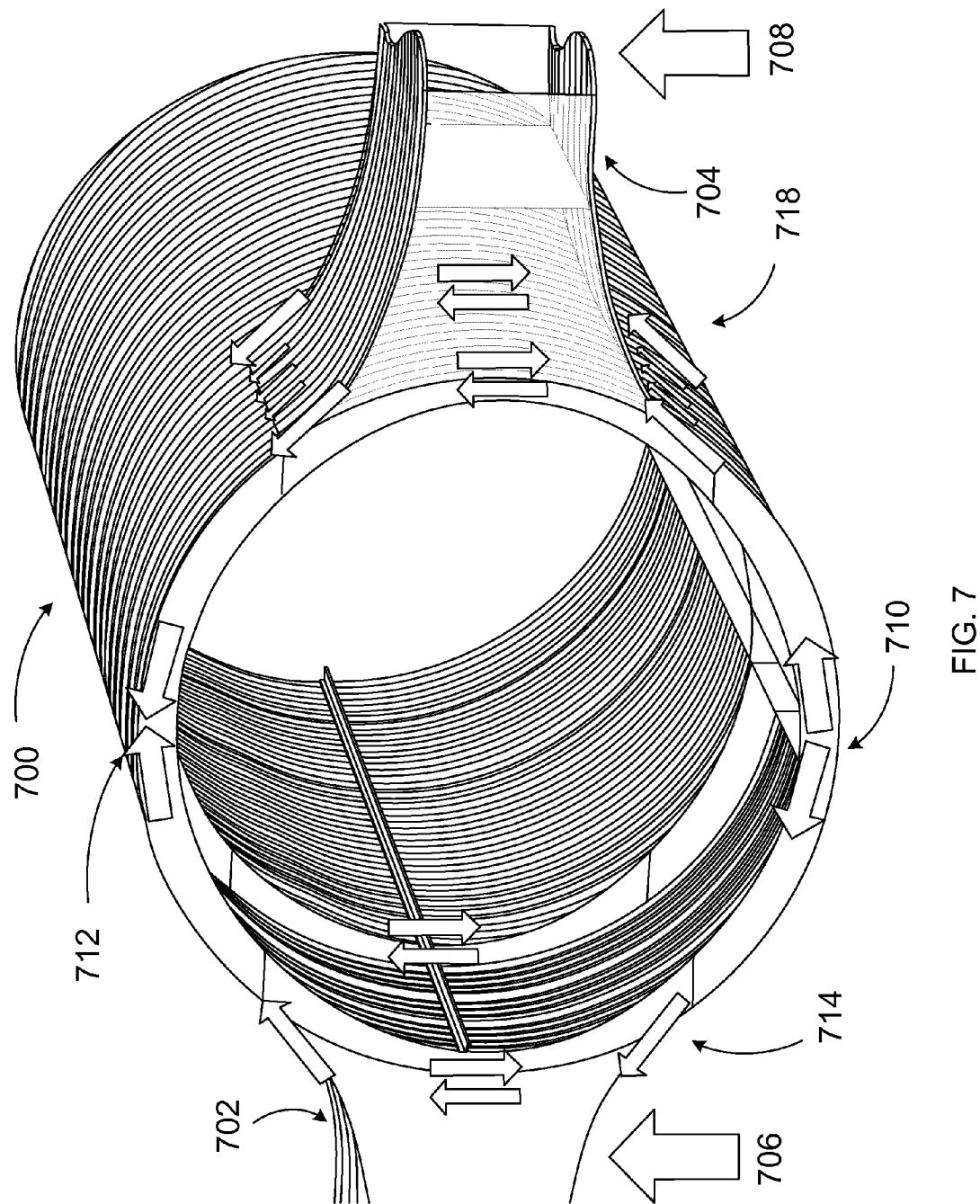
FIG. 7 is perspective front end view of an aircraft fuselage and wing showing exemplary force vectors, according to various embodiments presented herein.

FIG. 7 is an illustration showing possible forces acting on an aircraft using various embodiments of the present disclosure. Fuselage 700 has attached thereto wings 702 and 704. When in flight, the weight of fuselage 700 and wings 702 and 704 is substantially borne by wings 702 and 704. The lift of the aircraft creates upward force 706 and 708 on wings 702 and 704, respectively. Upward forces 706 and 708 impart torque on fuselage 700 in opposite directions. This torque causes tension 710 along the bottom of fuselage 700 and compression 712 along the top of fuselage 700. In some embodiments, because the wing spars (not shown) of wings 702 and/or 704 are circumferentially attached to fuselage 700, tension 710 is canceled by compression 712, and vice versa. Thus, in some embodiments, rotational forces, such as rotational forces 714 and 718, may be partially or fully canceled by an equal and opposite rotational force. Therefore, in some configurations, various loads of the wing may be reacted into the frame of the aircraft.

Additionally, various embodiments disclosed herein may provide for the ability to absorb dynamic flight loads in a manner better than conventional aircraft construction. Aircraft experience loaded and unloaded conditions, caused by various factors including, but not limited to, the pressurization of the fuselage and the flexing of the aircraft wings, when both in-flight and not in flight. The configuration of FIG. 7 may allow the aircraft to receive a dynamic flight load at a plurality of circumferential stringers in a fuselage portion of an aircraft. In response to receiving the dynamic flight load, the tension or compressive forces corresponding to the dynamic flight load may be distributed circumferentially around the fuselage portion substantially normal to a longitudinal axis of the fuselage portion. The circumferential stringers, such as stringers 112 of FIG. 2, may be configured to flex in a desired direction when the aircraft moves from an in-flight condition to an out-of-flight condition.

Figure 8:
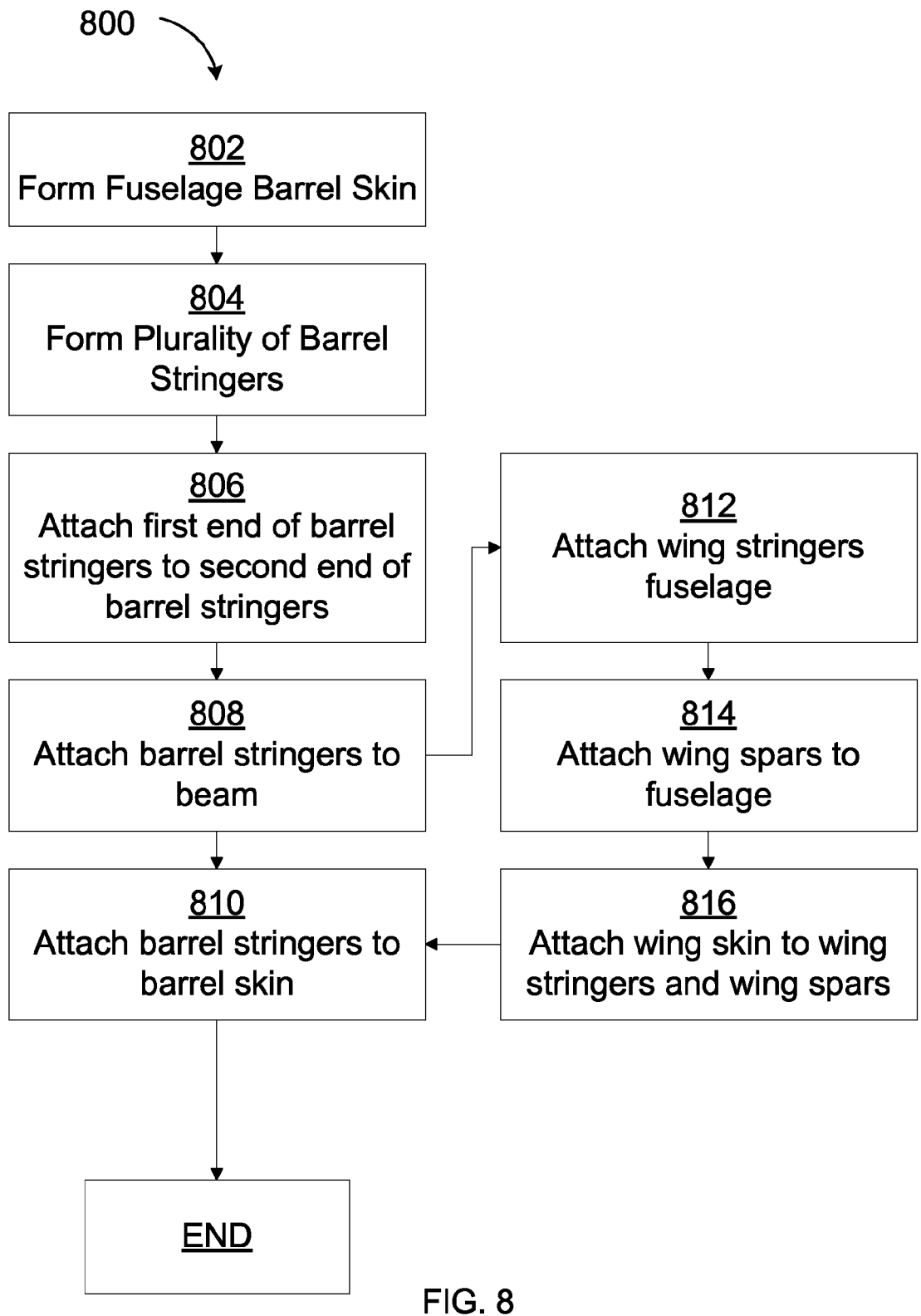
FIG. 8 is a process flow diagram illustrating a method for using circumferential stringers and a method for attaching a wing to a fuselage using wing spars, according to various embodiments presented herein.

Turning now to FIG. 8, an illustrative routine 800 for reinforcing an aircraft is described in detail. Unless otherwise indicated, it should be appreciated that more or fewer operations may be performed than shown in the figures and described herein. Additionally, unless otherwise indicated, these operations may also be performed in a different order than those described herein. Further, unless otherwise indicated, a particular component or feature identified in a figure is for descriptive purposes only and does not represent an intent to limit routine 800 or a particular operation to the identified component or feature.

Routine 800 begins at operation 802, where a skin 204 is formed having an inside surface. In some embodiments, the skin extends longitudinally along a first axis X-Y. From operation 802, routine 800 continues to operation 804, whereby a plurality of circumferential stringers 112 is formed. In some embodiments, the circumferential stringers 112 are circumferentially oriented and substantially parallel to each other. In further embodiments, the circumferential stringers 112 are comprised of circumferential blade stringers 312 having a top cap 308 and a web portion 306. In other embodiments, the circumferential stringers 112 are circumferential corrugated stringers 412 having a top section 414a-b and bottom section 418a-b.

Routine 800 continues from operation 804 to operation 806, where a first end of at least a portion of the circumferential stringers 112 may be attached to a second end of at least a portion of the circumferential stringers 112. Various methods of attachment may be used, including, but not limited to, thermal welding and rivets. It should also be understood that the present disclosure is not limited to circumferential stringers 112 having one end attached to another end, or any particular method of manufacturing/attaching, as circumferential stringers 112 may be attached to various components of an aircraft, including, but not limited to keel beam 110 or crown beam 210, as disclosed by way of example in operation 808.

Routine 800 continues from operation 806 to operation 808, where at least a portion of the circumferential stringers 112 are attached to a beam, such as keel beam 110 or crown beam 210. Various methods of attachment may be used, including, but not limited to, thermal welding and rivets. Further, it should be understood that other beams may be used, including, but not limited to, side beam 212.

Routine 800 continues from operation 808 to operation 810, where a least a portion of the skin 204 is coupled to at least a portion of the plurality of circumferential stringers 112 so that the at least a portion of the plurality of circumferential stringers 112 are aligned normal to the first axis X-Y. Various methods of attachment may be used, including, but not limited to, thermal welding and rivets.

In some embodiments, it may be useful to attach one or more wings (or other aircraft components) to the fuselage prior to coupling the skin 204 to the circumferential stringers 112. Therefore, if it is desirable or necessary to attach one or more wings, for example, wing 602, to the fuselage section 600, prior to operation 810, routine 800 can continue from operation 808 to operation 812, where a plurality of wing stringers 606 are coupled to an inside surface of a wing skin. In some embodiments, the wing stringers 606 can be aligned so that they line up with the circumferential stringers 112. In further embodiments, the wing stringers can be positioned between one or more of the circumferential stringers 112. For example, and not by way of limitation, one or more of the circumferential corrugated stringers 412 may be disposed on bottom sections 418a-b between top sections 414a-b if circumferential stringers 112 are of circumferential corrugated stringers 412. In another example, and not by way of limitation, one or more of the wing stringers 114 or wing stringers 116 may be disposed in the spaces between blade stringers 312 having a top end cap 308 and a web portion 306, whereby blade stringers 312 are disposed in a space between top end cap 308 of circumferential blade stringers 312.

Routine 800 can continue from operation 812 to operation 814, where one or more wing spars 610a, 610b, 612a and 612b having an aperture 614a, 614b, 616a, and 616b, respectively, are circumferentially disposed and attached to the fuselage section 600. In some embodiments according the present disclosure, one or more wing spars 610b and 612b may be used to affix a wing 602 to the fuselage section 600 without the need for a conventional wing box. It should be appreciated that the same attachment operation 814 may be used for other aircraft components, such as, but not limited to a wing, horizontal or vertical stabilizers. Depending on the angular displacement between a wing 602 and a fuselage section 600 to which the wing is to be attached, the spar aperture 614a, 614b, 616a, and 616b may vary in circumference and shape. It should be appreciated that wing 602 may have disposed therein fewer or more spars than two spars, without departing from the scope of this disclosure and the accompanying claims. Routine 800 can continue from operation 814 to operation 816, where a wing skin is coupled to the wing spars 610a, 610b, 612a and 612b and wing stringers 606, if not already performed. It should be noted that, in some embodiments, the wing skin may be integral to, continuous, or the same skin as the skin covering fuselage section 600.

Based on the foregoing, it should be appreciated that technologies for reinforcement of various components of an aircraft utilizing vertically-oriented circumferential stringers have been presented herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. An aircraft, comprising:
   a fuselage comprising:
      a plurality of circumferential corrugated stringers having a continuous, corrugated pattern with a series of sequential and contiguous ridges and valleys, the ridges coupled to an inside surface of a fuselage skin and disposed substantially normal to a first axis;
      the fuselage skin extending longitudinally along the first axis; and
      at least one beam disposed generally parallel to the first axis; and
   a wing comprising:
      a wing skin having an inside surface, a first end adjacent to the fuselage and a second end distal to the first end extending from the first end to the second end along a generally linear second axis; and
      a plurality of wing stringers coupled to the inside surface of the wing skin and disposed generally parallel to the second axis within the valleys of the plurality of circumferential corrugated stringers.

2. The aircraft of claim 1, wherein the beam is a keel beam or a crown beam.

3. The aircraft of claim 1, wherein at least a part of the fuselage skin is attached to the beam.

4. The aircraft of claim 1, wherein the fuselage skin comprises a composite material.

5. The aircraft of claim 4, wherein the composite material comprises a carbon fiber reinforced composite or a carbon fiber reinforced thermoplastic composite.

6. The aircraft of claim 1, wherein at least a portion of the plurality of circumferential stringers are bonded via a thermal process to at least a portion of the inside surface of the fuselage skin.

7. The aircraft of claim 1, wherein the continuous, corrugated pattern comprises a series of sequential and contiguous ridges and valleys, wherein each ridge is defined by the top section of a circumferential corrugated stringer and each valley is defined by the bottom section of a circumferential corrugated stringer.

8. The aircraft of claim 1, wherein at least a portion of the plurality of wing stringers are attached to the beam.

9. The aircraft of claim 1, wherein at least a portion of the plurality of wing stringers are attached to at least a portion of a plurality of wing stringers of a second wing.

10. The aircraft of claim 1, wherein the wing comprises a forward spar and an aft spar.

11. The aircraft of claim 10, wherein the forward spar and the aft spar are attached to the fuselage.

12. The aircraft of claim 11, wherein the forward spar or the aft spar are attached to the fuselage at an angle to provide for a swept-wing configuration.

13. The aircraft of claim 1, wherein the wing further comprises at least one rib coupled to at least a portion of the wing stringers.

* * * * *